Patented Dec. 15, 1953

2,662,863

UNITED STATES PATENT OFFICE 2,662,863

EMULSION POLYMERIZATION OF VINYL ACETATE

John E. Bristol, Niagara Falls, Warren A. Harrington, Wilson, and Norris Turnbull, Grand Island, N. Y., assignors to E. I. du Pont de Nemours & Company, Wilmington, Del., a corporation of Delaware No Drawing. Application December 14, 1950, Serial No. 200,871

6 Claims. (Cl. 260—27)

This invention relates to the emulsion polymerization of vinyl acetate and more particularly to the preparation of an improved aqueous dispersion of polyvinyl acetate.

Stable aqueous dispersions of polyvinyl acetate ordinarily called "polyvinyl acetate emulsions" are commonly made by dispersing monomeric vinyl acetate in water in the presence of a suitable dispersing agent, generally with the aid of rapid stirring or other suitable agitation and polymerizing the dispersed monomer by the addition of a polymerization catalyst at a suitable temperature or by subjecting it to other polymerizing conditions, for example, by exposure to actinic radiation. The art is replete with a variety of methods for carrying out such emulsion polymerizations to obtain the so-called emulsions which are relatively stable aqueous dispersions of solid polyvinyl acetate existing in the form of very fine particles.

Such vinyl acetate emulsions are useful for a variety of purposes, including adhesive and coating uses. The emulsions, when spread upon a solid surface and permitted to dry, form continuous films which are often transparent. Such films spread between two solid bodies and permitted to dry there form an excellent adhesive bond. For such coating and adhesive uses, the emulsions may be mixed with other ingredients, solid or liquid, to serve as fillers, pigments, reinforcing agents, extenders, plasticizers and solvents. For example, by suitable addition of pigments and solvents, the emulsions may be utilized in water-base paint formulations.

In the uses of the polyvinyl acetate emulsions as coatings and adhesives, difficulties have arisen because of the lack of adequate water resistance. The presence of the dispersing agent utilized in making the emulsion, is mainly responsible for the lack of water resistance in films obtained from the emulsion. The dispersing agent tends to cause the redispersion of the polymer thus imparting to the films the effect of water solubility to a greater or less extent.

Various methods have been proposed heretofore for reducing the water sensitivity of films obtained from polyvinyl acetate emulsions. One method is to treat the film during or after its formation with a substance which chemically reacts with the dispersing agent to destroy its effectiveness as a dispersing agent. In many emulsions which utilize water soluble grades of polyvinyl alcohol as dispersing agents, water sensitivity can be reduced more or less by treating the emulsion during or after a coating process with a material such as an aldehyde or the like which will insolubilize the polyvinyl alcohol, thereby destroying its dispersing activity. Such methods have the disadvantage of requiring additional operational steps such as treating the coated articles or mixing in a treating agent just prior to application of the vinyl resin emulsion. Another method comprises adding to the vinyl resin emulsion materials capable of insolubilizing the polyvinyl alcohol or other dispersing agent to the emulsion. This method has been only partially successful for the reason that generally such reagents tend to react with the dispersing agent while the emulsion is in storage or shipment, thus causing coagulation. It has long been desired to produce a stable polyvinyl acetate emulsion which can be stored and shipped for indefinite periods of time without coagulation and which, when spread into a film and dried at temperatures of 20 to 25° C. or higher, form a film which does not redisperse when contacted with water.

For many uses of the polyvinyl acetate emulsions high dilution stability is a very desirable property. In many applications, for example, in applying the vinyl resin to textile and paper products it is desired to dilute the emulsion with water to as low as 1 to 3% polymer concentration. Generally, it is not possible to dilute polyvinyl acetate emulsions to a polymer content of less than about 30% as at lower concentrations the emulsion becomes unstable and the vinyl resin particles tend to coagulate or settle out to an excessive extent. Consequently for applications requiring high dilutions, it has been necessary to add a protective colloid or thickening agent or to continuously agitate the diluted emulsion, or both.

An important characteristic of a polyvinyl acetate emulsion is the solids content, that is the proportion of the polyvinyl resin to the water in the emulsion. A high solids content generally is to be preferred as such a product, particularly if it has high dilution stability, is useful for many purposes requiring varying solids content over a wide range. It is generally difficult to increase the solids content of a vinyl resin dispersion without sacrificing other desirable properties such as high stability, resistance of films to the action of water and the like. Heretofore it has been difficult if not impossible to prepare emulsions having more than around 30 to 40% of polyvinyl acetate which have a high degree of stability during storage and shipment and which form films having a high degree of resistance to water. It has been particularly difficult to produce such dispersions with solids content above 40% by weight of polyvinyl acetate, which have a high degree of mechanical stability.

By the term "mechanical stability" as used herein, we mean the stability of a dispersion against coagulation when subjected to the action of mechanical force such as stirring, shaking or other forms of mechanical agitation. Often dispersions have a high degree of stability and will not coagulate on standing for indefinite periods of time so long as the dispersion stands quiescent and the dispersed particles are subjected to no exterior mechanical forces, except the force of gravity. Many such dispersions, however, when agitated as by stirring, flowing through pipe lines or subjected to the agitation normally occurring in transportation, tend to coagulate under the influences of such mechanical forces. For most commercial uses, high mechanical stability is an important and desired property for polyvinyl acetate emulsions.

An object of this invention is an improved process for the production of polyvinyl acetate emulsion. A further object is to prepare a polyvinyl acetate emulsion, stable during storage and shipment, from which substantially completely water-resistant films can be cast without the necessity of chemical or heat treatments. Another object is to prepare polyvinyl acetate emulsions having the above properties and also a high solids content. Another object is to prepare polyvinyl acetate emulsions having high dilution stability and high mechanical stability. Still other objects of the invention will be apparent from the following description.

The above objects may be attained in accordance with the present invention by the herein described method for polymerizing vinyl acetate. This method depends upon the use of a completely hydrolyzed grade of polyvinyl alcohol (or certain other polyhydroxy polymeric film-forming substance hereinafter described) as the dispersing agent, the utilization of a certain technique in carrying out the polymerization and the presence, during at least a part of the polymerization reaction, of a cyclic alcohol selected from the group consisting of the sterols, abietyl alcohol, dehydroabietyl alcohol and hydroabietyl alcohols.

In one method for polymerizing vinyl acetate in accordance with our invention, we may first dissolve a completely hydrolyzed grade of polyvinyl alcohol in hot water to form a solution containing from 4.5 to 6% by weight of the polyvinyl alcohol. We then add a small amount of vinyl acetate not exceeding 1.5 to 3% of the weight of the aqueous solution and disperse this by adequate agitation. Polymerization catalyst is then added and the dispersion, with continued agitation, is brought to a suitable temperature, for example, 82 to 90° C. so as to cause polymerization of the dispersed vinyl acetate. At any time after the polymerization reaction has started, including a time sufficient to completely polymerize the initial quantity of vinyl acetate, further small quantities of vinyl acetate are added, either continuously or intermittently, provided that the amount of vinyl acetate added or the rate of addition of vinyl acetate is such that the amount of vinyl acetate in the reaction mixture never exceeds 5% of the weight of the aqueous portion, so long as the amount of polymer formed does not exceed 20% of the weight of said aqueous portion. When the amount of polymer formed has increased to more than 20% by weight of the aqueous portion, the addition of the vinyl acetate monomer may be increased, if desired, so long as it is then not permitted to exceed 3% by weight of the aqueous portion. The process is continued until the desired amount of polymer formed has reached 30 to 55% by weight of the mixture. As the polymerization progresses, further amounts of catalyst may be added, as required to maintain a suitable catalyst concentration.

The pH of the reaction mixture must be controlled and at the start of the reaction mixture must be above 4, e. g., at a pH of 6 to 8. During the reaction the pH will fall, due to some hydrolysis of vinyl acetate to form acetic acid. At completion of the polymerization the pH will be less than 6, e. g., around 3 to 4.

Before or during the polymerization reaction we add to the reaction mixture a small amount of cyclic alcohol, for example, cholesterol, in amount equal to not less than about 0.1% by weight of the water present in the completed dispersion. The cyclic alcohol may be added either before or during the polymerization reaction, provided that the alcohol is added before the polymerization is more than 50% complete. By percent complete, we mean the proportion of vinyl acetate which has been polymerized based on the total that is to be polymerized. For example, if the completed polyvinyl acetate emulsion is to contain 50% by weight of polyvinyl acetate, the polymerization is considered 50% complete when half of the required amount of vinyl acetate has been polymerized, that is, when the polymer concentration reaches about 33%. Preferably, at least part of the cyclic alcohol is added at the start of the polymerization. A convenient method is to dissolve the required amount of the alcohol in the vinyl acetate to be polymerized. Or, if desired, all or a part of the alcohol may be added to the water before the addition of any vinyl acetate.

The amount of the cyclic alcohol added may vary over a wide range, depending on the individual alcohol and the properties desired. For best results generally the proportion of the cyclic alcohol should be from about 0.25% of the weight of the water in the finished emulsion up to 5 times the limit of solubility of the alcohol in the water present. Still larger amounts can be used to produce emulsions having good mechanical stability, but the presence of such large amounts of undissolved alcohol tends to lower the quality of the product in regard to properties such as screening tests, smoothness and clarity of films cast from the emulsion, and the like. In making emulsions having a polyvinyl acetate content within the range of 40 to 60%, the amount of cyclic alcohol employed is preferably from about 0.04 to about 0.4% of the total weight of the finished emulsion.

The resulting polyvinyl acetate dispersions are latex-like or creamy compositions containing up to 55 to 60% by weight of polyvinyl acetate, which have high mechanical stability and which yield clear, transparent, substantially water insoluble films of vinyl acetate when spread on solid surfaces and dried at temperatures of 20 to 25° C. or higher.

We have found that such non-redispersible film-forming emulsions cannot be made (1) by using a partially hydrolyzed grade of polyvinyl alcohol as the emulsifying agent, regardless of the rate of monomer addition nor (2) by using a completely hydrolyzed grade of polyvinyl alcohol as emulsifier when the rate of monomer addition during polymerization is not maintained as described above.

The invention is further illustrated by the following examples. In these examples the properties of the polyvinyl emulsions noted were determined by the following "characterization procedures," except as otherwise indicated.

*Characterization procedures*

*Particle size.*—The particle size of the emulsion is determined by examination of a highly diluted sample under a microscope equipped with a calibrated scale.

*pH.*—Beckmann pH meter (measured at 25° C.).

*Viscosity.*—The viscosity is determined at 25° C. with a Brookfield viscosimeter, with the spindle rotating at 60 R. P. M. and reported in centipoises (cp.).

*Air-dried film.*—A 0.008" thick wet film is cast on a 7½" x 17" ground glass plate with a Boston Bradley adjustable blade doctor knife. It is placed in a constant temperature room at 72° F. and 72% relative humidity for 24 hours. This film is used for observation of clarity, redispersion and number of oscillations-wet rubs.

*Redispersion.*—Redispersion is noted when the above film is wet with water and rubbed with a nylon brush; if the water becomes milky, redispersion is stated to occur.

*Number of oscillations-wet rubs.*—The above indicated air-dried film is tested according to the Federal Specifications TTP-88a (with the modification that water instead of soap solution is used and no heat treatment of film is permitted) with a Gardner Model 105 washability and abrasion machine. In this test the film is scrubbed with a wet-weighted nylon brush. The number of oscillations of this wet scrubbing is noted when any area of the central 4" section of the film fails. A test of 4000 oscillations or better indicates excellent wet abrasion resistance. The designation "OK" indicates no observable failure of the film.

*Per cent screen test.*—A 100-gram sample of the emulsion is diluted with water to 1000 grams and is run through a weighed 200 mesh per sq. in. screen. The screen is washed until the filtrate is clear. It is then dried in the oven at 100–105° C. to constant weight. (An emulsion of 0.1% or less screen test on 200 mesh screen is acceptable to most users of polyvinyl acetate emulsions. In many applications, an emulsion with a screen test of 0.2% or greater would have to be screened before use.)

*6% solids dilution settling test.*—The polyvinyl acetate emulsion is diluted with water to 6% solids and 100 cc. of the diluted emulsion is allowed to stand for 24 hours. A reading is taken of the number of cc. of sludge settled out. (This is an indication of dilution stability. An emulsion of less than 2 cc. can be used by most emulsion consumers who apply the emulsion in a dilute form. An emulsion which contains more than 3 cc. of sludge in 100 cc. of 6% solids would be unsatisfactory for dilute application.)

*Mechanical stability test.*—Place 200 grams of sample in a 500 ml. beaker and with a stainless steel agitator running at 300–600 R. P. M. agitate sample at 20–30° C. until coagulation occurs or for 24 hours if no coagulation occurs. The beaker is cylindrical, about 2 inches in diameter by 6 inches high. The agitator is a two-bladed propeller 1 inch long (0.5 inch radius) by 0.5 inch wide, mounted on a vertical shaft about 0.25 inch in diameter. The mechanical stability is unsatisfactory if coagulation occurs in less than 8 hours. Mechanical stability is fair to good if coagulation occurs within the 8 to 16 hour interval and excellent if no coagulation occurs after 20 hours agitation.

EXAMPLE 1

*Materials*

| | |
|---|---|
| Water _____g__ | 640 |
| Completely hydrolyzed grade of polyvinyl alcohol _____g__ | 40 |
| NaHCO₃ _____g__ | 1.2 |
| Vinyl acetate_____g__ | 460 |
| Zinc formaldehyde sulfoxylate (8%)___cc__ | 25.4 |
| H₂O₂ (4%) _____cc__ | 25.2 |

*Polymerization*

The polyvinyl alcohol and sodium bicarbonate were mixed with the water in a vessel fitted with an agitator and reflux condenser. This mixture was then stirred and heated at 85° to 95° for about one hour. Vinyl acetate was slowly added until a mild reflux was obtained (about 1.3% vinyl acetate) to displace oxygen which inhibits polymerization. Hydrogen peroxide (4%) and zinc formaldehyde sulfoxylate (8%) were added, in equal amounts, at a rate which would give a satisfactory polymerization. The vinyl acetate was added at a rate which would maintain a steady reflux with the reactor at 85° to 87° C. and maintain monomer content within the range of 0.5 to 2% by weight. The polyvinyl acetate emulsion was then cooled to about 25° C. with mild stirring. The polymerization time was about two hours.

*Characterization*

| | |
|---|---|
| Polyvinyl acetate content_____ | 40%. |
| Particle size: | |
| Predominant spheres _____ | 0.5 micron. |
| Range spheres _____ | 0.2–3.0 microns. |
| Agglomerates _____ | Up to 9.0 microns. |
| pH _____ | 4.38. |
| Viscosity _____ | 730 cp. |
| Air-dried film _____ | Clear. |
| Redispersion _____ | None. |
| Screen test _____ | 0.27%. |
| 6% solids dilution settling test_____ | 0.5 cc. |
| Number of oscillations-wet rubs_____ | OK at 10,000. |

EXAMPLE 2

*Materials*

| | |
|---|---|
| Water _____cc__ | 350 |
| Completely hydrolyzed grade or polyvinyl alcohol _____g__ | 17 |
| NaHCO₃ _____g__ | 0.75 |
| Vinyl acetate_____cc__ | 500 |
| Zinc formaldehyde sulfoxylate (6%)__cc__ | 16.5 |
| H₂O₂ (4%) _____cc__ | 16.5 |

*Polymerization*

The procedure of Example 1 was followed, except that the polymerization temperature was 84 to 87° C. and the time was 1.75 hours.

*Characterization*

| | |
|---|---|
| Polyvinyl acetate content_____ | 55%. |
| Particle size _____ | Mainly ca. 1–2 microns. |
| pH _____ | 4.5. |
| Viscosity _____ | 1,320 cp. |
| Air-dried film _____ | Cloudy, rough. |
| Redispersion _____ | None. |
| Screen test _____ | Over 1%. |
| 6% solids dilution settling test__ | 1.5 cc. |
| Number of oscillations-wet rubs__ | OK at 5,000. |
| Mechanical stability test_____ | Coagulates in less than 15 minutes. |

EXAMPLE 3

Materials

| | | |
|---|---|---|
| Water | g | 775 |
| Completely hydrolyzed grade of polyvinyl alcohol | g | 49.4 |
| NaHCO$_3$ | g | 1.02 |
| Vinyl acetate | g | 663 |
| Cholesterol | g | 6.3 |
| Zinc formaldehyde sulfoxylate (6%) | cc | 19 |
| H$_2$O$_2$ (4%) | cc | 21 |

Polymerization

The cholesterol was dissolved in the vinyl acetate before adding the latter to the reaction mixture. The reaction temperature was 84–85° C. and the time of polymerization was 3 hours. Otherwise, the procedure was the same as in Example 1.

Characterization

| | |
|---|---|
| Polyvinyl acetate content | 40%. |
| Particle size: | |
|   Predominant spheres | 0.1 micron. |
|   Range of spheres | 1–3 microns. |
| pH | 4.4. |
| Viscosity | 980 cp. |
| Air-dried film | Clear. |
| Redispersion | None. |
| Screen test | 0.012%. |
| Mechanical stability test | OK at 8 hours. |

EXAMPLE 4

Materials

| | | |
|---|---|---|
| Water | g | 700 |
| Completely hydrolyzed grade of polyvinyl alcohol | g | 24 |
| NaHCO$_3$ | g | 1.5 |
| Cholesterol | g | 1.0 |
| Vinyl acetate | g | 920 |
| Zinc formaldehyde sulfoxylate (8%) | cc | 40 |
| H$_2$O$_2$ (4%) | cc | 40 |

Polymerization

The cholesterol was added to the aqueous portion separately and simultaneously with the first addition of vinyl acetate. The reaction temperature was 85–88° C. and the reaction time was 2.5 hours. Otherwise, the procedure was the same as in Example 1.

Characterization

| | |
|---|---|
| Polyvinyl acetate content | 55%. |
| Particle size: | |
|   Range of spheres | Predominantly 0.2–0.5 micron. |
|   Maximum spheres | Some ca. 3.0 microns. |
| pH | 3.8. |
| Viscosity | 3,800 cp. |
| Air-dried film | Clear. |
| Mechanical stability test | OK at 8 hours. |

EXAMPLE 5

Materials

| | | |
|---|---|---|
| Water | g | 700 |
| Completely hydrolyzed grade of polyvinyl alcohol | g | 34 |
| NaHCO$_3$ | g | 1.5 |
| Cholesterol | g | 6.5 |
| Vinyl acetate | g | 902 |
| Zinc formaldehyde sulfoxylate (6%) | cc | 33 |
| H$_2$O$_2$ (4%) | cc | 33 |

Polymerization

The procedure of Example 3 was employed, except that the reaction temperature was 82–85° C. and the reaction time was 3.5 hours.

Characterization

| | |
|---|---|
| Polyvinyl acetate content | 55%. |
| Particle size: | |
|   Range of spheres | Predominantly 0.2–0.3 micron. |
|   Maximum spheres (except irregulars) | Up to 1.5 microns. |
|   Irregulars | A few 6 microns. |
| pH | 5.4. |
| Viscosity | 1,800 cp. |
| Air-dried film | Clear. |
| Screen test | 0.0055%. |
| Mechanical stability test | OK at 8 hours. |

EXAMPLE 6

Materials

| | | |
|---|---|---|
| Water | g | 700 |
| Completely hydrolyzed grade of polyvinyl alcohol | g | 34 |
| NaHCO$_3$ | g | 1.5 |
| Hydroabietyl alcohol ("Abitol") | g | 4.0 |
| Vinyl acetate | cc | 980 |
| Zinc formaldehyde sulfoxylate (6%) | cc | 39 |
| H$_2$O$_2$ (4%) | cc | 39 |

Polymerization

The procedure of Example 3 was employed, dissolving the "Abitol" in the vinyl acetate. ("Abitol" is a hydrogenated abietyl alcohol product supplied by Hercules Powder Company, 82% by weight of which consists of 85 parts by weight of tetrahydroabietyl alcohol and 15 parts of dihydroabietyl alcohol.) The reaction time was 2.5 hours and the reaction temperature was 83–85° C.

Characterization

| | |
|---|---|
| Polyvinyl acetate content | 55%. |
| Particle size: | |
|   Mainly | ca. 0.2 micron. |
|   Some to | 3.0 microns. |
|   Some "rods" | ca. 3 x 15 microns. |
| pH | 4.3. |
| Viscosity | 5,400 cp. |
| Air-dried film | Clear. |
| Screen test | 0.011%. |
| 6% solids dilution test | Trace. |
| Mechanical stability test | OK at 12 hours. |

EXAMPLE 7

Materials

| | | |
|---|---|---|
| Water | cc | 700 |
| Completely hydrolyzed grade of polyvinyl alcohol | g | 24 |
| NaHCO$_3$ | g | 1.5 |
| Cholesterol | g | 1.0 |
| Hydroabietyl alcohol ("Abitol") | g | 4.0 |
| Vinyl acetate | cc | 1,000 |
| Zinc formaldehyde sulfoxylate (6%) | cc | 44 |
| H$_2$O$_2$ (4%) | cc | 44 |

Polymerization

The procedure of Example 6 was employed. Reaction temperature was 84–86° C.; reaction time, 3.5 hours.

Characterization

| | |
|---|---|
| Polyvinyl acetate content | 55%. |
| Particle size: | |
|   Predominant spheres | ca. 0.5 micron. |
|   Range spheres | To 1.0 micron. |
|   Irregulars | 6–10 microns. |
| pH | 4.1. |
| Viscosity | 3,700 cp. |
| Air-dried film | Clear. |
| Screen test | 0.023%. |
| Mechanical stability test | OK at 18 hours stirring. |
| Number of oscillations-wet rubs | OK at 23,000. |

Remarks concerning the examples

Example 1: This illustrates a 40% solids emulsion made with a completely hydrolyzed grade of polyvinyl alcohol.

Example 3 is substantially the same as Example 1, except for the addition of cholesterol. This addition reduces the predominant particle size from 0.5 micron to 0.1 micron and the screen test from 0.27% to 0.012% in the 40% solids emulsion.

Example 2 is similar to Example 1, except that the solids contents is raised to 55% and the ratio of polyvinyl alcohol to water is less to keep the viscosity down to a workable range. The resulting emulsion is mechanically unstable, the average particle size more than doubles and the screen test is very high. However, Example 5 shows that the employment of cholesterol in making this 55% solids emulsion results in small particle size, good mechanical stability and excellent screen test.

The cholesterol can most effectively be used if present in the polyvinyl alcohol solution at the beginning of vinyl acetate additions, as shown by Example 4, where the amount employed is only about one sixth of that in Example 3.

The polyvinyl alcohols suitable as emulsifiers in practicing our invention are those which are made by reacting polyvinyl acetate with an alcohol or water until at least 98% of the acetate groups have been converted to hydroxyl groups. We prefer to use polyvinyl alcohols which are thus 99 to 100% saponified. Such polyvinyl alcohols are herein and in the appended claims termed "completely hydrolyzed grade of polyvinyl alcohol."

The above described completely hydrolyzed grade of polyvinyl alcohol as generally made is insoluble or only slightly soluble in cold water, i. e., at temperatures below 50° C.; and in order to prepare an aqueous solution thereof for the practice of this invention we usually stir a mixture of water and the polyvinyl alcohol at a temperature above 50° C. until a substantially clear solution is found. Preferably, we stir the mixture to disperse the polyvinyl alcohol (in finely divided form) in the water and heat the dispersion at 80 to 95° C. for about one hour, to obtain a clear solution. Such solution may be cooled to room temperature, without precipitation of dissolved polyvinyl alcohol.

Certain polyhydroxy polymeric film-forming substances other than the completely hydrolyzed grades of polyvinyl alcohol may also be used as dispersing agents in our process, for example, certain starches and hydroxy alkyl celluloses. To serve as a substitute for completely hydrolyzed grades of polyvinyl alcohol in this process, the polymeric material must contain hydroxyl groups in proportions equal to or greater than that of other functional groups (such as ether groups, ester groups, carboxyl, sulfonyl and the like) and must also have substantially the water solubility characteristics described above. That is, it must be substantially insoluble or only slightly soluble in water at temperatures below 50° C. but soluble when heated with water at temperatures at or above 50° C. (e. g., 70 to 100° C.), to form solutions. One example is any of the various known "soluble" starches, which must be heated to 70° or higher in contact with water to form aqueous solutions. Such soluble starch, suitable for our purpose, may be made, for example, by partially sulfonating starch, so that less than half of the hydroxyl group of the starch are sulfonated. Other forms of modified starch containing a preponderance of free hydroxyl groups and having the above solubility characteristics may be used as well.

The hydroxy alkyl cellulose (hydroxy alkyl cellulose ethers) which have the above described solubility characteristics, e. g., hydroxy ethyl cellulose, also may be used in place of the completely hydrolyzed grades of polyvinyl alcohol to practice our invention.

The concentration of dispersing agent in the polymerization reaction mixture will vary, depending on its dispersing power and the viscosity of its aqueous solution. For example, a completely hydrolyzed grade of polyvinyl alcohol, a 4% by weight aqueous solution of which has a viscosity less than 100 centipoises at 20° C., will be employed as a 4.5 to 6% by weight aqueous solution. Still higher concentrations, e. g., 6 to 10%, may be employed if desired. Other completely hydrolyzed grades of polyvinyl alcohol whose aqueous solutions have higher viscosities may be used in lower concentrations, e. g., around 2%. In general the concentrations of dispersing agent in the practice of our invention does not depart from conventional practice in emulsion polymerization of vinyl acetate, sufficient dispersing agent being employed to form a stable dispersion of the resulting polymer.

The catalyst preferably used in our process is the type we term "activated peroxide type" polymerization catalyst, by which term we mean the combination of a peroxygen compound and a reducing agent, for example, a bisulfite, sulfurous acid, sulfoxylate or other sulfoxy compound having reducing properties. The peroxygen compound may be hydrogen peroxide, an organic peroxide such as benzoyl peroxide, acetyl peroxide or the like, an organic or inorganic peracid or a salt thereof, e. g., peracetic acid, perborates and persulfates. The best results generally are obtained by using a water soluble peroxygen compound, e. g., hydrogen peroxide or an inorganic persulfate or perborate. Also we generally prefer to add the peroxygen compound and the reducing compound separately to the polymerization reaction mixture. A preferred catalyst is the combination of hydrogen peroxide with a sulfoxylate, e. g., zinc formaldehyde sulfoxylate separately added. Such activated peroxygen type polymerization catalysts are well known in the art and are described, for example, in Brubaker et al., U. S. P. 2,462,354. While we prefer to utilize the above "activated peroxide" type of catalyst, the invention is not restricted thereto, as other catalyst suitable for the polymerizaion of vinyl acetate may be used, for example, any of the various peroxygen compounds such as those mentioned above, with or without the addition of reducing agents or other activating materials and the various azo compounds which have been more recently discovered to catalyze vinyl acetate polymerization.

The amount of catalyst and the temperature of the reaction mixture during the polymerization are not critical and may follow conventional procedures for the polymerization of vinyl acetate. We generally prefer to add the catalyst in small amounts simultaneously with the addition of the monomer, but such is not essential, so long as the catalyst concentration is maintained sufficiently high to cause polymerization.

In practicing our invention to produce stable polyvinyl acetate emulsions which on drying at 20 to 25° C. form films highly resistant to redispersion in water it is essential that:

(1) The dispersing agent be either a completely hydrolyzed grade of polyvinyl alcohol as defined above or other polyhydroxy polymeric substance in which free hydroxyl groups are present in amount equal to or greater than other functional groups and which is soluble in water at a temperature above 50° C. but insoluble in water at temperatures below 50° C.

(2) The amount of monomeric vinyl acetate present in the reaction mixture does not exceed 5% of the weight of the water present when the polymer content of the emulsion is 20% by weight or less, and does not exceed 3% of the weight of the water when the polymer content is above 20% by weight.

(3) The initial pH of the polymerization reaction mixture must be above 4 and must be permitted to fall to a pH not higher than 6 before completion of the reaction.

(4) The polymerization is continued until the polymer content has reached at least 20% by weight but not more than about 55 to 60%.

If any one of the above four requirements is not met in the polymerization procedure, the resulting product will not be a stable emulsion which forms water-resistant films on drying. For example, if the dispersing agent is a partially hydrolyzed grade of polyvinyl alcohol, the resulting emulsion will not form water-resistant films, regardless of the regulation of monomer content during polymerization. If the monomer content of the reaction mixture initially exceeds 5% or exceeds 3% when the polymer content is above 20% during the polymerization reaction, the water resistance of films cast from the resulting product will be unsatisfactory.

Proceeding in accordance with the above stated four essential requirements, dispersions which produce films not redispersible in water can be made without the addition of the cyclic alcohol. However, without the addition of a cyclic alcohol, e. g., cholesterol, before the polymerization is more than 50% complete, the emulsion will not have high dilution stability or high mechanical stability. The dilution stability can be evaluated by means of the "6% solids dilution settling test" described above. As shown by the above examples, the addition of the cyclic alcohol markedly reduces the amount of solids settled out in 24 hours from an emulsion diluted to 6% polymer concentration. In general the effect of the cholesterol or other suitable cyclic alcohol is to decrease the particle size of the dispersed polymer and also to decrease the amount of agglomerates. This effect is demonstrated by the above described "Per cent screen test." The presence of the cyclic alcohol during polymerization also imparts to the resulting emulsion a high degree of mechanical stability as shown by the "Mechanical stability test."

Further, the hereindescribed use of the cyclic alcohol is essential to produce emulsions having the above described properties, while containing more than 30 to 40% by weight of polyvinyl acetate, e. g., up to around 55%.

In place of cholesterol we may use any other water-soluble sterol or mixtures of such sterols. Suitable sterols may be either of animal origin or of plant origin (phytosterols). Examples of suitable sterols are cholesterol, isocholesterol, oxychloesterol, agnosterol, lanosterol, sitosterol, dihydrositosterol, stigmasterol and ergosterol.

It is preferable to use the sterols in as pure state as possible to avoid contamination of the polyvinyl acetate emulsion with excessive amounts of impurities such as fats and the like which may accompany the sterols in their commercial forms. However, the objects of this invention may be attained by using commercial sterol products such as commercial soy sterols, commercial wool fat sterols, ox bile extract and the like.

In addition to the sterols, cyclic alcohols suitable for practicing our invention include abietyl alcohol, the hydroabietyl alcohols, the sulfonated hydroabietyl alcohols, and dehydroabietyl alcohol. We prefer to use the hydroabietyl alcohols or commercial products containing them. A commercial product which is suitable for practicing the invention is "Abitol" a crude mixture of hydroabietyl alcohols produced by the Hercules Powder Company and which contains dihydroabietyl alcohol and tetrahydroabietyl alcohol.

Control of monomer content of the polymerization reaction mixture is an important and essential feature of our process. During the reaction, the monomer content, regulated by the rate of addition of monomer, must not exceed 5% by weight of the reaction mixture when the polymer content is 20% by weight or less and must not exceed 3% by weight when the polymer content exceeds 20%. Preferably, we begin the reaction with around 1 to 1.5% of vinyl acetate in the emulsion and maintain the vinyl acetate content at 1.5 to 3% during most of the reaction. By employing a nitrogen atmosphere to exclude air as described below, we may maintain the vinyl acetate monomer content at not over about 0.4%, which gives the best product at reasonably low catalyst consumption. If desired, the monomer content may be maintained as low as 0.1%. To control the monomer concentration, the vinyl acetate is added substantially at the rate of its polymerization and catalyst is added continuously or intermittently as required to maintain reaction.

It is desirable to exclude air from the reaction mixture, as molecular oxygen has an inhibitory effect on the polymerization. Preferably, the air is excluded by operating in a closed reactor equipped with a reflux condenser and maintaining an atmosphere of vinyl acetate vapor over the reaction mixture. Alternatively, the reactor free space may be filled with an oxygen-free, inert gas such as nitrogen.

In practicing our invention, for the best results the polyvinyl alcohol should be substantially completely dissolved in the water before the vinyl acetate and polymerization catalyst are added. As most of the completely hydrolyzed grades of polyvinyl alcohol are difficult to dissolve in cold water, we generally heat and stir a mixture of the polyvinyl alcohol and water at 70 to 100° C. until substantially complete solution is obtained.

It is essential that the pH of the polymerization reaction mixture initially be above 4 and we prefer an initial pH of around 6 to 8. To insure a reasonably high pH we generally prefer to add a mild alkaline buffer such as sodium bicarbonate, disodium phosphate, sodium acetate, or the like. If the mixture initially contains acetic acid, it may be neutralized by adding the above alkali or a stronger alkali such as sodium hydroxide, sodium carbonate or the like. As the polymerization proceeds, the pH of the reaction mixture generally falls, due to formation of acetic acid, caused by hydrolysis of part of the vinyl acetate monomer. Preferably, the initial pH is so adjusted (e. g., to pH of 6 to 8) so that the final pH is above 4. However, a good product may be obtained at a final pH below 4, provided that during the greater part of the reaction the pH is above 4. When a mild alkaline buffer such as sodium bicarbonate or disodium phosphate is used to adjust the initial pH, we prefer to add the buffer to the water before dissolving the polyvinyl alcohol therein.

If the initial pH is below 4, the resulting emulsion produces water dispersible films. Low initial pH also tends to cause undue thickening of the emulsion, increase in particle size of the dispersed polymer, aggregation of particles and coagulation.

The polymerization temperature is not particularly critical and temperatures conventionally employed for polymerizing vinyl acetate with peroxide catalyst are suitable, e. g., from 50 to 90° C. We generally prefer to maintain the reaction mixture at reflux temperature, e. g., at 85 to 90° C. In operating at lower temperatures without refluxing, we prefer to maintain a nitrogen atmosphere in the reactor to exclude air.

The emulsions prepared as described herein are aqueous dispersions of solid polyvinyl acetate having improved characteristics. Films made by drying these emulsions at 20 to 25° C. or higher are substantially insoluble (i. e., not redispersible) in water at any temperature. These emulsions are further characterized by unusually small particle size of the polyvinyl acetate, and relative freedom from agglomerates. They have a high degree of stability both in concentrated and diluted forms and in particular, have a high degree of mechanical stability. The emulsions may be made with solids (polyvinyl acetate) content as high as 55 to 60%, substantially without diminution or impairment of the above stated properties. The emulsions are useful for a variety of purposes, particularly for coating solid surfaces, and as adhesives. For such purposes the emulsions may be used per se or in combination with other ingredients such as pigments, extenders, fillers, plasticizers, colorants and the like.

We claim:

1. The process which comprises dispersing vinyl acetate monomer in an aqueous 2 to 10% by weight solution of a hydrophilic dispersing agent which is a polyhydroxy, polymeric, film-forming substance substantially insoluble in water at temperatures below 50° C. but soluble in water at a temperature not lower than 50° C. to form a dispersion containing not more than 5% by weight of said monomer, subjecting said dispersion to polymerization in the presence of a peroxygen type catalyst, while dispersing therein further quantities of said monomer so as to maintain a monomer concentration not greater than 5% by weight when the polymer concentration is not over 20% by weight and not greater than 3% by weight when the polymer content has exceeded 20% by weight, continuing as above until the polymer content has reached 20 to 60% by weight, controlling the pH of the polymerization reaction mixture so that it is initially not less than 4 and finally not greater than 6 and adding to the reaction mixture before polymerization is 50% complete a cyclic alcohol selected from the group consisting of the sterols, abietyl alcohol, dehydroabietyl alcohol the hydroabietyl alcohols and the sulfonated hydroabietyl alcohols in amount equal to not less than about 0.1% by weight of the water present.

2. The process which comprises dispersing vinyl acetate monomer in an aqueous 2 to 10% by weight solution of a completely hydrolyzed grade of polyvinyl alcohol to form a dispersion containing not more than 5% by weight of said monomer, subjecting said dispersion to polymerization in the presence of a peroxygen type catalyst, while dispersing therein further quantities of said monomer so as to maintain a monomer concentration not greater than 5% by weight when the polymer concentration is not over 20% by weight and not greater than 3% by weight when the polymer content has exceeded 20% by weight, continuing as above until the polymer content has reached 20 to 60% by weight, controlling the pH of the polymerization reaction mixture so that it is initially not less than 4 and finally not greater than 6 and adding to the reaction mixture before polymerization is 50% complete a cyclic alcohol selected from the group consisting of the sterols, abietyl alcohol, dehydroabietyl alcohol, the hydroabietyl alcohols and the sufonated hydroabietyl alcohols in amount equal to not less than about 0.1% by weight of the water present.

3. The process which comprises dispersing vinyl acetate monomer in an aqueous 2 to 10% by weight solution of a completely hydrolyzed grade of polyvinyl alcohol in concentration of said monomer equal to 0.1 to 3% by weight, subjecting the resulting dispersion to polymerization in the presence of peroxygen type polymerization catalyst and adding and dispersing therein further amounts of said monomer in such quantities that the monomer concentration never exceeds a certain value, depending upon the concentration of dispersed polymer, as follows: not over 5% when the polymer concentration is not over 20% by weight; not over 3% when the polymer concentration is more than 20% by weight; continuing said addition of monomer until the resulting dispersion contains 20 to about 55% by weight of polymer, controlling the pH of the polymerization reaction mixture so that it is initially not less than 4 and finally not more than 6 and adding to the reaction mixture before polymerization is 50% complete a cyclic alcohol selected from the group consisting of the sterols, abietyl alcohol, dehydroabietyl alcohol, the hydroabietyl alcohols and the sulfonated hydroabietyl alcohols in amount equal from 0.25% by weight of the water present up to 5 times the limit of solubility of the alcohol in the water.

4. The process according to claim 3 in which the polymerization catalyst is an activated peroxide type and the cyclic alcohol is cholesterol.

5. The process according to claim 3 in which the polymerization catalyst is an activated peroxide type and the cyclic alcohol is abietyl alcohol.

6. The process according to claim 3 in which the polymerization catalyst is an activated peroxide type and the cyclic alcohol is hydroabietyl alcohol.

JOHN E. BRISTOL.
WARREN A. HARRINGTON.
NORRIS TURNBULL.

References Cited in the file of this patent

UNITED STATES PATENTS

| Number | Name | Date |
| --- | --- | --- |
| 2,388,600 | Collins | Nov. 6, 1945 |
| 2,508,341 | Wilson | May 16, 1950 |
| 2,552,328 | Kropa | May 8, 1951 |

FOREIGN PATENTS

| Number | Country | Date |
| --- | --- | --- |
| 627,612 | Great Britain | Aug. 11, 1949 |

OTHER REFERENCES

Warth, The Chemistry and Technology of Waxes, Reinhold 1947, pp. 80 and 81.